March 9, 1965 A. E. KEMP 3,172,578
LUBRICANT METERING DEVICE
Filed Dec. 13, 1962
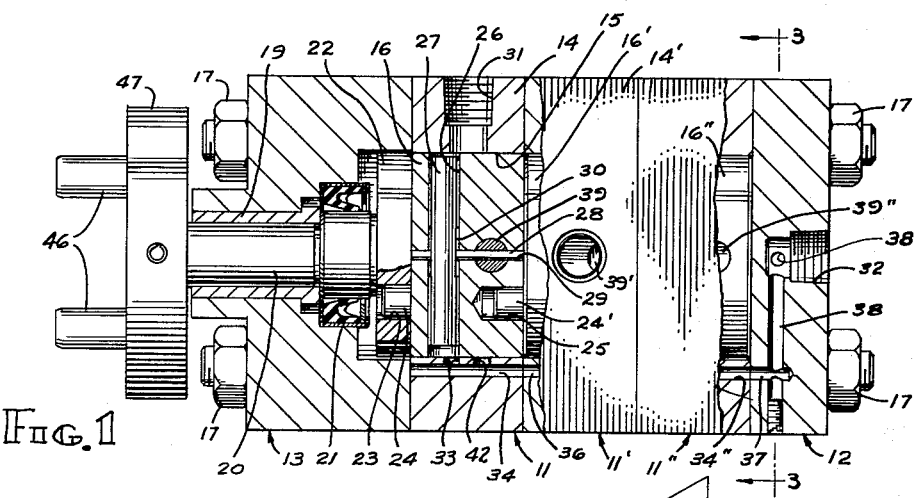
FIG. 1
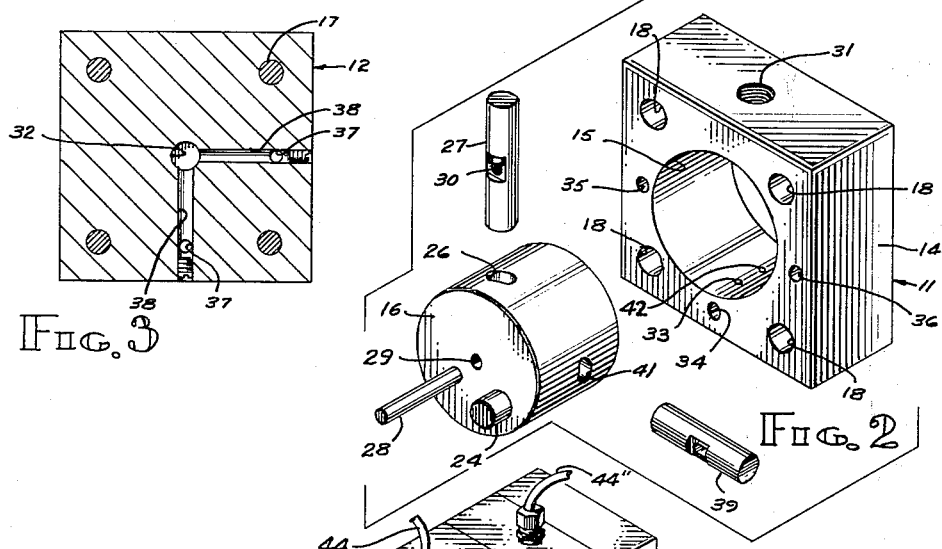
FIG. 3
FIG. 2
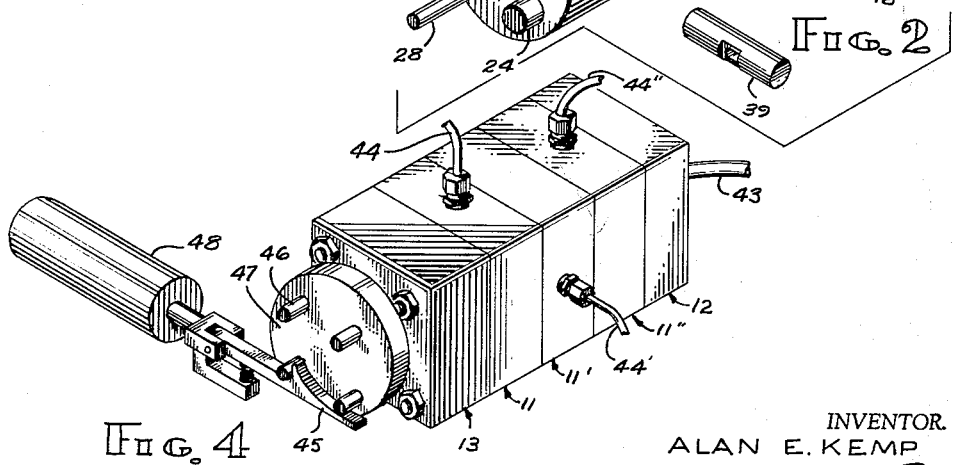
FIG. 4
INVENTOR.
ALAN E. KEMP
BY
ATTY.

United States Patent Office 3,172,578
Patented Mar. 9, 1965

3,172,578
LUBRICANT METERING DEVICE
Alan E. Kemp, Janesville, Wis., assignor, by mesne assignments, to Gilman Engineering & Mfg. Co., Inc., Janesville, Wis., a corporation of Wisconsin, a subsidiary of Gisholt Machine Company
Filed Dec. 13, 1962, Ser. No. 244,357
4 Claims. (Cl. 222—219)

The present invention relates to lubricant metering devices and more specifically to devices for periodically metering predetermined quantities of lubricant to machine elements from a pressurized source in response to a mechanical actuation of the device.

A principal object of the invention is to simplify and increase the versatility of such lubricant metering devices of the type comprising a shuttle piston reciprocably movable in a bore in a rotary cylindrical valve, whereby lubricant is discharged alternately by each end of the shuttle piston by the force of the pressurized lubricant acting on the opposite end of the piston.

Another important object of the invention is to provide such a metering device comprising a plurality of substantially identical metering units, in order that any desired number of such units may be assembled in a compact device to individually meter specific quantities of lubricant to a plurality of different machine elements in response to the operation of a single valve actuating mechanism.

Yet another object of the invention is to provide for varying the metering capacity of the units by the simple expedient of exchanging the inexpensive shuttle pistons for similar pistons dimensioned to discharge the desired quantity of lubricant.

Still another object of the invention is to provide such metering units in which the rotary valve member is provided with a plurality of angularly disposed transverse shuttle pistons to deliver metered quantities of lubricant to a given machine element several times during each revolution of the rotary valve.

These and other important objects of the invention will be apparent from the following description, reference being made to the accompanying drawings in which:

FIG. 1 is a front elevational view, partly in section, of a lubricant metering device according to a preferred embodiment of the invention embodying three metering units;

FIG. 2 is an exploded perspective view of one of the individual metering units;

FIG. 3 is a cross sectional view taken along the lines 3—3 of FIG. 1; and

FIG. 4 is a perspective view of the metering device showing one form of actuating mechanism.

Referring now to the drawings, and particularily to FIG. 1, the illustrated device comprises three substantially identical metering units 11, 11′ and 11″, mounted in coaxial alignment between manifold end member 12 and shaft support end member 13. For purposes of clarity, the corresponding elements of the three metering units are designated by the same number distinguished by the appropriate superscript.

Metering unit 11 comprises a valve body block 14 provided with a cylindrical bore 15 in which is located an accurately fitting cylindrical rotary valve member 16. In the assembled device, the metering units are sandwiched between the end members with the adjacent flat faces held in fluid-tight contact by means of bolts 17 extending through holes 18 in the end members and valve body blocks.

Shaft support end member 13 is provided with a bushing 19 which rotatably supports valve actuating shaft 20, and with a rotary seal 21 to prevent loss of lubricant through the bushing. The enlarged inner end 22 of shaft 20 includes a hole 23 adapted to receive a drive pin 24 extending axially from rotary valve member 16, to impart rotary motion from the shaft to the rotary valve member. A similar hole 25 aligned with drive pin 24 on the opposite side of member 16 in turn receives pin 24′ of rotary valve member 16′, etc., whereby all of the rotary valve members are caused to rotate with shaft 20. By this arrangement, any number of units may be sandwiched between members 12 and 13 merely by employing bolts 17 of appropriate lengths. This advantageous construction is additionally facilitated by providing a slight amount of clearance between the drive pins and their respective holes to allow for any slight amount of misalignment that may occur between the units.

As illustrated in FIGS. 1 and 2, a transverse cylindrical bore 26 extends through rotary valve member 16 and receives a closely fitting reciprocable shuttle piston 27, the axial movement of which is limited by a pin 28 axially located in hole 29 in the valve member and extending through a slot 30 in the shuttle piston.

With the device in the illustrated condition, one end of bore 26 is in direct communication with threaded discharge hole 31, and the other end of the bore is in communication with threaded inlet hole 32 via port 33, and passageways 34, 36′, 34″, 37 and 38 in the body blocks and the manifold end member. Inlet hole 32, in turn, is connected to the pressurized lubricant source by appropriate tubing and fittings, partially shown at 43 in FIG. 4, whereby the pressurized lubricant enters bore 26 and displaces shuttle piston 27 to the position illustrated, at which further movement is prevented by pin 28. When the valve member is rotated through 180°, the opposite end of bore 26 is aligned with port 33 and the shuttle piston is again displaced by the pressurized lubricant, thereby forcing the lubricant at the end of the bore opposite port 33 into the discharge hole 31, and through an appropriate conduit, as partially shown at 44 (FIG. 4), which communicates with the machine element to be lubricated.

Obviously, each time the shaft is rotated 180°, an amount of lubricant determined by the diameter and stroke of shuttle piston 27 is delivered by the shuttle piston. However, in the illustrated embodiment of the invention, a second shuttle piston 39 is provided in bore 41 of valve member 16 at right angles to bore 26. When aligned therewith, bore 41 likewise communicates directly with discharge hole 31, and with passage 34 via port 42. Thus, one or the other of the shuttle pistons delivers a metered amount of lubricant for each 90° rotation of the shaft. A simple arrangement for rotating the shaft in such 90° increments is shown in FIG. 4, and comprises a reciprocable spring loaded pawl 45 adapted to engage one of four studs 46 on disk member 47 attached to shaft 20, and to unidirectionally rotate the shaft through 90° each time the pawl is reciprocated, as for example by air cylinder 48. Alternatively, for some applications, the device could be rotated at a constant speed rather than by periodic actuation.

The double piston arrangement not only facilitates the rapid and simple actuation of the metering device, but also allows the delivering of lubricant to various machine elements at different intervals. For example, if it is desired to deliver lubricant to one machine element twice as often as to a second element, the first element may be lubricated by a double piston unit and the second element by a single piston unit. Although not illustrated, it would also be possible to employ more than two pistons in one valve unit if so desired by increasing the thickness of the otherwise substantially similar unit.

Since the amount of lubricant delivered by each unit depends solely on the diameter and stroke of the piston, this quantity may be readily varied within a given range by substituting shuttel pistons having slots of different lengths, or, if more lubricant is required than can be delivered by a piston of given diameter even with a maximum stroke, by exchanging the entire rotary valve for one having a larger piston.

As shown in FIG. 2, each metering unit is provided with two holes 35 and 36 extending through the body block but not communicating with the rotary valve. These holes, along with hole 34, cooperate with the corresponding holes in the other units and with the passageways 37 and 38 in the manifold end member (FIG. 3) to permit the units to be assembled with the outlet of each unit in one of two positions at right angles to one another. Although in the illustrated embodiment it is not possible to position the outlets of two units in opposite directions, an annular lubricant channel may be provided in the face of each block concentric with the rotary valve and intersecting passageway 34, thereby permitting any unit to be positioned with its outlet facing in any of the four directions.

While the device has been described in terms of its application to metering lubricants, it is obvious that it could also be employed for metering fluids of other types. Likewise, while only one embodiment of the invention is illustrated, various modifications thereof could be made without departing from the spirit and scope of the invention. Accordingly, the foregoing description is to be taken as illustrative only, the scope of the invention being defined by the following claims.

I claim:
1. A fluid metering device comprising:
(A) a first end member rotatably supporting a shaft therein,
(B) a second end member,
(C) a selected plural number of like metering units sandwiched between said end members in aligned fluid-tight relation, each of said units comprising;
 (a) a body member provided with parallel end surfaces and with a cylindrical bore extending therebetween,
 (b) a cylindrical rotary valve member individual to each body member mounted for rotation in said bore and having a transverse bore extending therethrough,
 (c) a piston member axially movable in said transverse bore,
 (d) means defining fluid inlet and outlet passageways located in said body member for simultaneous communication with opposite ends of said transverse bore when said bore is aligned therewith,
 (e) means for coupling said valve member to adjacent valve members for simultaneous rotational movement,
(D) means for coupling said shaft to the adjacent valve member for simultaneous rotational movement, and
(E) means for imparting rotational movement to said shaft member.

2. A device according to claim 1 in which the axial movement of each piston member is limited by a pin extending axially of said valve member through said transverse bore and through an aperture in the central portion of said piston member.

3. A device according to claim 1 in which at least one of said units comprises a rotary valve member including a second transverse bore with a second piston therein, said second bore being also adapted to simultaneously communicate with said inlet and outlet passageways at one rotational position of said valve member and being offset from said first transverse bore axially of said rotary valve member.

4. A device according to claim 1 in which said body members are provided with cooperating apertures communicating said inlet passageways with a single inlet opening in said second end member.

References Cited in the file of this patent
UNITED STATES PATENTS

| | | |
|---|---|---|
| 30,866 | Bell | Dec. 11, 1860 |
| 540,257 | Jones | June 4, 1895 |
| 734,258 | Fetters | July 21, 1903 |
| 1,676,377 | Bergmann | July 10, 1928 |
| 2,427,680 | Leonard | Sept. 23, 1947 |
| 2,468,675 | Leonard | Apr. 26, 1949 |